US010583702B2

(12) United States Patent
Stone

(10) Patent No.: US 10,583,702 B2
(45) Date of Patent: Mar. 10, 2020

(54) METHOD AND APPARATUS FOR WHEEL ASSEMBLY

(71) Applicant: Compagnie Generale des Etablissements Michelin, Clermont-Ferrand (FR)

(72) Inventor: James Edward Stone, Pelzer, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 88 days.

(21) Appl. No.: 16/067,600

(22) PCT Filed: Dec. 29, 2016

(86) PCT No.: PCT/US2016/069150
§ 371 (c)(1),
(2) Date: Jun. 30, 2018

(87) PCT Pub. No.: WO2017/117368
PCT Pub. Date: Jul. 6, 2017

(65) Prior Publication Data
US 2019/0009624 A1    Jan. 10, 2019

Related U.S. Application Data

(63) Continuation of application No. PCT/US2015/068345, filed on Dec. 31, 2015.

(51) Int. Cl.
B60C 25/05 (2006.01)
B60B 9/26 (2006.01)
B60C 7/18 (2006.01)
B60C 7/24 (2006.01)
(Continued)

(52) U.S. Cl.
CPC ............ B60C 25/05 (2013.01); B60B 1/14 (2013.01); B60B 9/26 (2013.01); B60C 7/18 (2013.01); B60C 7/24 (2013.01); *B60B 2320/10* (2013.01); *B60B 2900/541* (2013.01); *B60C 2007/146* (2013.01)

(58) Field of Classification Search
CPC ............ B60C 25/132; B60B 2007/146; B60B 2320/10; B60B 31/005; Y10T 29/49519; Y10T 29/53848; B25B 27/023
USPC ............................ 29/700, 259, 245, 894.341
See application file for complete search history.

(56) References Cited

U.S. PATENT DOCUMENTS 1,021,440 A * 3/1912 Arnold ...................... B60B 9/26
152/84
1,537,662 A * 5/1925 Flick .................... B60B 31/005
157/1
(Continued)

OTHER PUBLICATIONS

International Search Report and Written Opinion, dated Apr. 13, 2017.

*Primary Examiner* — Jacob J Cigna
*Assistant Examiner* — Michael W Hotchkiss
(74) *Attorney, Agent, or Firm* — John Steckler Schwab

(57) ABSTRACT

An apparatus and method of assembling a radially outer portion of a nonpneumatic wheel onto a hub (100) having a plurality of slots (150) extending along an axis, each of the slots (150) arranged in a frustoconical orientation extending from the first end (632) to the second end (634) such that the distance between the slots is greater at the first end than at the second end.

20 Claims, 14 Drawing Sheets

(51) Int. Cl.
*B60B 1/14* (2006.01)
*B60C 7/14* (2006.01)

(56) References Cited

U.S. PATENT DOCUMENTS

| | | | | |
|---|---|---|---|---|
| 1,538,613 A | * | 5/1925 | Bomar | B60B 31/005 157/9 |
| 1,597,223 A | * | 8/1926 | Wagenhorst | B60B 31/005 157/1 |
| 1,730,559 A | * | 10/1929 | Carnahan | B60B 9/26 157/1 |
| 3,513,534 A | * | 5/1970 | Caldwell | B21D 39/044 29/468 |
| 6,286,572 B1 | * | 9/2001 | Chen | B60B 9/04 152/393 |
| 7,201,194 B2 | * | 4/2007 | Rhyne | B60B 9/04 152/11 |
| 9,180,732 B2 | * | 11/2015 | Endicott | B60B 1/0223 |
| 2014/0035215 A1 | * | 2/2014 | Young | B25B 27/0071 269/90 |

* cited by examiner

METHOD AND APPARATUS FOR WHEEL ASSEMBLY

PRIORITY STATEMENT

The present application claims priority to PCT/US15/68345, filed Dec. 31, 2015 in the United States Receiving Office.

FIELD OF THE INVENTION

The subject matter of the present invention relates to a method and apparatus for assembly of a wheel.

BACKGROUND OF THE INVENTION

The details and benefits of non-pneumatic wheels are described e.g., in U.S. Pat. Nos. 6,769,465; 6,994,134; 7,013,939; and 7,201,194, herein incorporated by reference in their entirety. Some non-pneumatic tire constructions incorporate a shear band, embodiments of which are described in e.g., U.S. Pat. Nos. 6,769,465 and 7,201,194, herein incorporated by reference in their entirety. Such non-pneumatic tires provide advantages in tire performance without relying upon a gas inflation pressure for support of the loads applied to the tire.

In one example of a non-pneumatic wheel, a compliant band with a ground contacting portion can be connected with a plurality of tension-transmitting, web-like elements (also referred to as "spokes") extending radially from a center element or hub. By way of example, such non-pneumatic wheel may be formed by open cast molding in which a material such as e.g., polyurethane is poured into a mold that forms all or part of the non-pneumatic tire. One or more reinforcement structures such as cords may be molded in place in the compliant band.

In one example of a non-pneumatic wheel, the spokes of the tire are mechanically attached to the center hub. In one particular example of mechanical attachment, the spokes each have a thickened radially inner end and each spoke engages one of a plurality of axially oriented slot in the outer circumference of the hub. The mechanical attachment allows the outer portion of the wheel to be formed separately then assembled with the hub at a later stage of manufacturing. It also allows the wheel to be disassembled such as for repairs.

Aligning each spoke, either individually or collectively, is a challenging step of assembly of the spokes and hub of the non-pneumatic wheel, particularly when a pretension is desired to be applied to each of the spokes such that the spokes are under tension in the wheel when the wheel is unloaded. Accordingly, a method of assembling an plurality of spokes of a non-pneumatic wheel with another component of the wheel, such as the hub, would be useful. An apparatus that facilitates assembly of a plurality of spokes with another component of the wheel would also be beneficial. A method and apparatus that facilitates and fixation of the spokes to a hub and enables creation of a desired amount of spoke pretension during assembly would be particularly useful.

SUMMARY OF THE INVENTION

Aspects and advantages of the invention will be set forth in part in the following description, or may be obvious from the description, or may be learned through practice of the invention.

In one exemplary embodiment a method uses a guide for assembling and attaching a non-pneumatic wheel's radially outer portion to the non-pneumatic wheel's hub, the radially outer portion of the wheel having a plurality of spokes attached at their radially outer end to a compliant outer band, each spoke having a thickened radially inner end, and the hub having a plurality of slots. The guide includes a first end, a second end, a length extending from the first end to the second end, an outer circumferential surface, and a plurality of slots formed in the outer circumferential surface, the slots extending the length of the guide arranged in a frustoconical orientation extending from the first end to the second end. Each of the slots of the guide become narrower toward the guides outer surface. The slots of the guide may widen at said first end to facilitate alignment of the spoke ends into the guide slots.

The guide is aligned with the hub of wheel such that each of the hub's spoke slots are aligned with the slots in guide's second end. The spokes are positioned and slid into the first end of the guide. They are pushed along the guide until the spoke enter the hub slots. Once the spokes are within the hub, the guide is removed.

In another exemplary embodiment, the outer surface of the guide is also frustoconically shaped.

In another exemplary embodiment, the slots formed in the outer circumferential surface of the hub are also frustoconically oriented.

In at least one embodiment, the spokes are retained by threaded fasteners which are secured in the spoke slot ends of the hub.

In another exemplary embodiment, the guide also includes at least one wheel assembly retainer, to force the outer wheel assembly down the guide, and a linear actuator, for the application of force to move the outer wheel assembly down the guide. The hub and guide are held in place by a pusher plate which applies a force in the opposite direction to the force applied by the wheel assembly retainer.

In at least one embodiment the linear actuator is a helically threaded rod, the threads engaging corresponding threads in the pusher plate. To facilitate operation, the retainers may be operated by at least one actuator. Alternatively, the retainers may be manually positioned. An alternative embodiment uses a hydraulic piston as the linear actuator instead of a helically threaded rod.

In one exemplary embodiment a method uses a guide for assembling and attaching a non-pneumatic wheel's radially outer portion to the non-pneumatic wheel's hub, the radially outer portion of the wheel having a plurality of spokes attached at their radially outer end to a compliant outer band, each spoke having a thickened radially inner end, and the hub having a plurality of slots. The guide includes a first end, a second end, a length extending from the first end to the second end, an outer circumferential surface, and a plurality of slots formed in the outer circumferential surface, the slots extending the length of the guide arranged to extend from the first end to the second end whereby the distance between the slots at the first end is larger than the distance between the slots at the second end of the guide. Each of the slots of the guide become narrower toward the guide's outer surface.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

The present invention provides a method and apparatus for assembly of a wheel. The method and apparatus may be used particularly for assembly of a nonpneumatic wheel and more particularly for a nonpneumatic tire having a plurality of spokes.

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

The following terms are defined as follows for this disclosure:

"Axial direction" or the letter "A" in the figures refers to a direction parallel to the axis of rotation of for example, the shear band, tire, and/or wheel as it travels along a road surface. Also referred to as "lateral direction."

"Radial direction" or the letter "R" in the figures refers to a direction that is orthogonal to the axial direction and extends in the same direction as any radius that extends orthogonally from the axial direction.

"Equatorial plane" means a plane that passes perpendicular to the axis of rotation and bisects the shear band and/or wheel structure. The "medial plane" is the equatorial plane that bisects the tire in roughly 2 equal halves.

"Radial plane" means a plane that passes perpendicular to the equatorial plane and through the axis of rotation of the wheel.

"Coefficient of friction," unless otherwise stated, means the dry, unlubricated coefficient of dynamic friction measured at 20 degrees Celsius with a normal force of 10 Newton applied to a specimen with a square contact area of 40 square centimeters against a second specimen of the same material.

Figure 1:
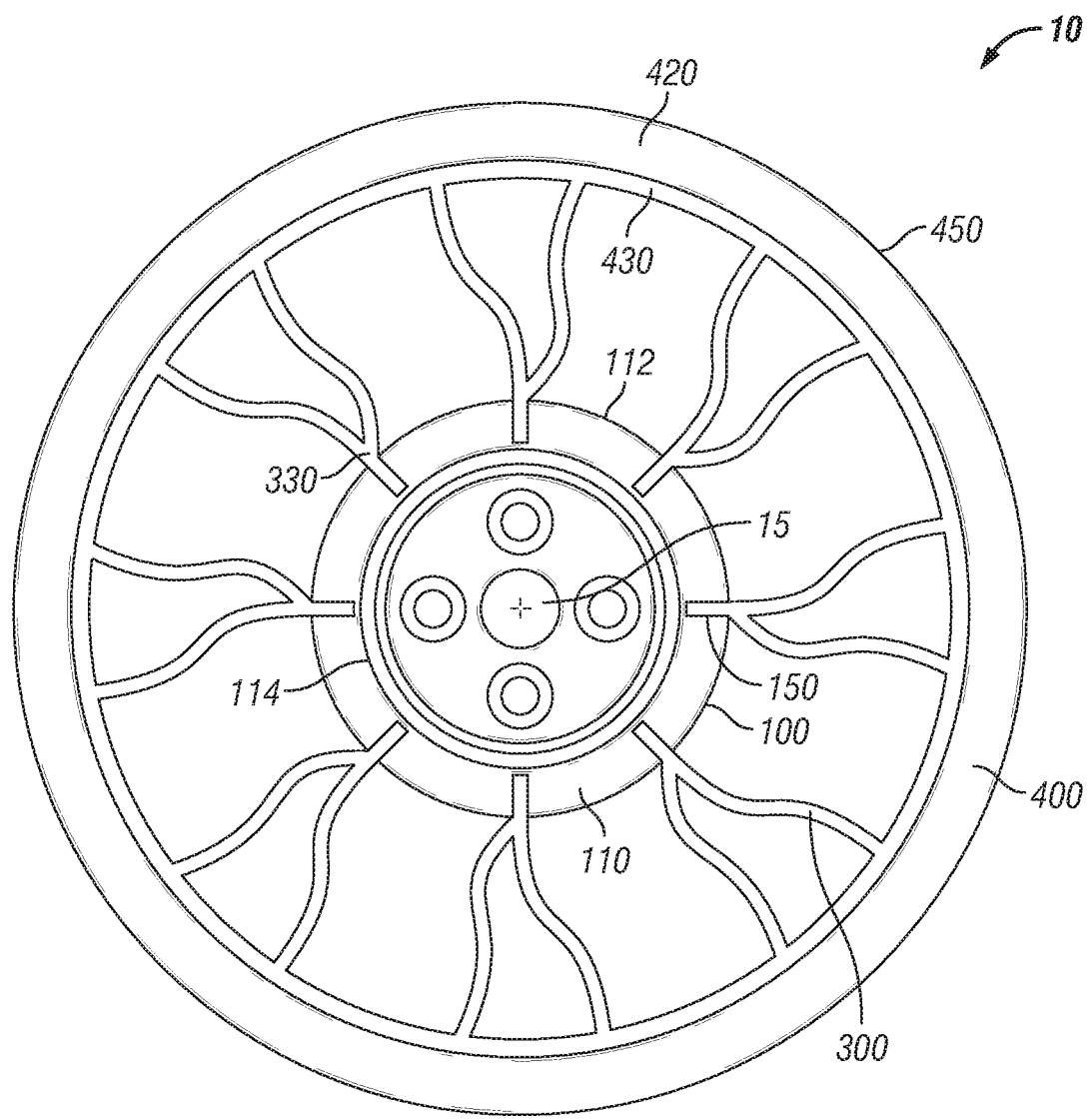
FIG. 1 provides a side view along the axis of rotation of an embodiment of a non-pneumatic wheel from a first side.

FIG. 1 provides a side view of an embodiment of a non-pneumatic wheel 10 along the axis of rotation 15 of the wheel from a first side. The wheel 10 includes a hub 100, an outer annular band 400 and a plurality of spokes 300 connecting the hub 100 to the outer band 400. With this particular embodiment, the spokes are bifurcated or joined at the radially inner end of the spokes such that they form a v-shape. Other embodiments could include spokes that are not connected, or spokes connected in other ways. For example, the spokes may be connected to form a honeycomb shape.

The outer annular band 400 provides a radially outer surface 450 which may have a tread pattern, such as grooves, divots, slits or other features, or a combination of features, for ornamental and/or a utilitarian purpose. The outer annular band 400 in the present embodiment is compliant, in that it will deform under loading to absorb momentary deflections such as bumps in the surface, such as the ground, that the wheel is placed against.

The outer annular band 400, may include reinforcements, including such reinforcements having a high modulus in compression and tension such as metal cords, fiberglass, fiber reinforced plastics, or carbon fiber. The spokes 300, as shown in the embodiment here are compliant membranes of an elastomeric material, such as a natural, synthetic rubber, polyurethane, silicone, and may be reinforced with cords having a higher tensile modulus including nylon, polyester, aramid fibers or other reinforcements such as metal cord. When a load is applied to the wheel 10, the load is transmitted through the hub 100 and spokes 300 positioned around the hub through the outer annular band 400 to the ground. Since the spokes, are largely deformable and will buckle under loading, a significant portion of the load is transferred through the spokes on the top half of the wheel. This is generally referred to herein as a "top loading" wheel, as opposed to a "bottom loading" wheel that would carry the load through the bottom of the tire, such as might be found in a solid tire, or a foam filled pneumatic tire.

In the embodiment shown, the radially outer band 400 is comprised of a radially outer portion 420 bonded to a radially inner portion 430. The radially inner portion 430 is formed unitarily with the spokes 300, such as when the spokes 300 and radially inner portion 430 of the radially outer band 400 are formed of a polyurethane poured against a radially outer portion 420 of the radially outer band. The radially outer band 420 may be comprised of a different material, such as rubber. Other embodiments are also possible, such as an alternative embodiment where the spokes 300 are formed individually and bonded to the radially outer band 400. In another alternative embodiment, the spokes 300 and radially outer portion 420 formed as a unitary structure.

The hub 100 possesses a frustoconical outer surface 110 with the central axis of coinciding with the axis of rotation 15 of the wheel 10. Here, in this view, the larger diameter portion 112 of the hub 100 is positioned behind the smaller diameter portion 114. Here the spokes 300 are retained in slots 150 formed in the outer surface 110 of the hub. The slots 150 extend through the larger axial end 114 surface to allow insertion of the spokes 300. In the embodiment shown, the slots 150 stop short of extending through the smaller axial end 112 surface of the hub 100.

Figure 2:
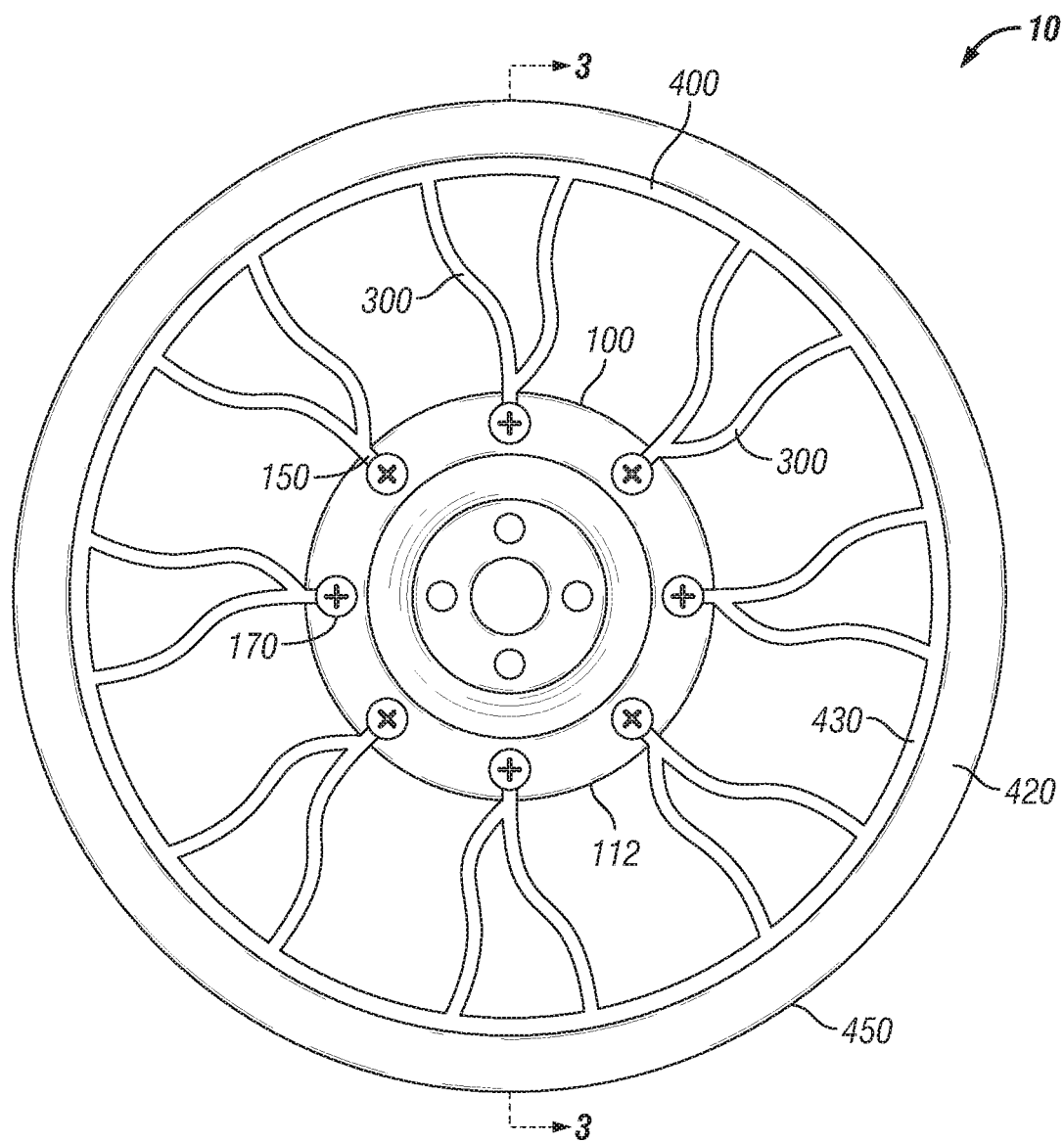
FIG. 2 provides a side view along the axis of rotation of an embodiment of a non-pneumatic wheel from a second side.

FIG. 2 provides a side view along the axis of rotation of the embodiment from the opposite second side than what is shown in FIG. 1. From the perspective of this view, the larger diameter portion 112 of the hub 100 is shown in front of the smaller diameter portion 114. Fasteners 170 prevent the spokes 300 from egressing from the spoke slots 150.

Figure 3:
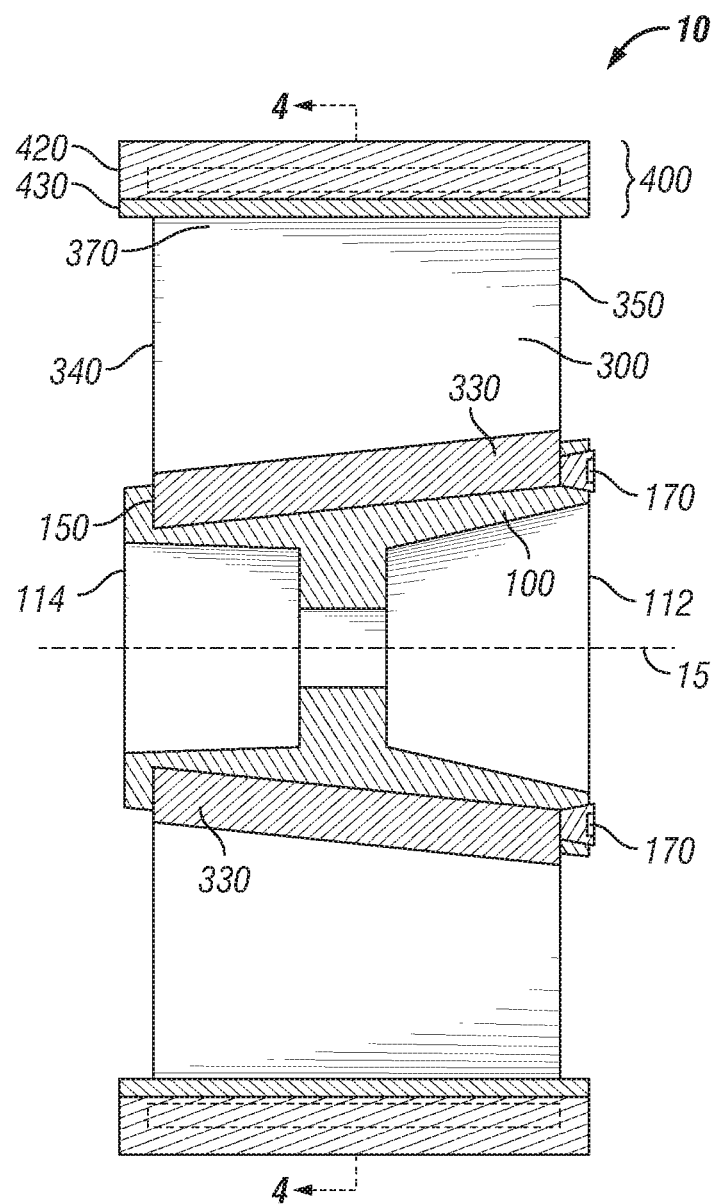
FIG. 3 provides a section view of the non-pneumatic tire taken along line 3-3 in FIG. 2.

FIG. 3 provides a section view of the non-pneumatic tire taken along line 3-3 in FIG. 2. Here, the sloping frustoconical shaped hub 100 section can be observed. The spokes 300 are trapezoidal in shape, having a first lateral edge 340 which is longer than a second lateral edge 350. This shape may be present in the spoke in the relaxed state (disconnected from the hub) or alternatively the spoke may have a different shape depending upon the amount of pretension desired at a given location in the spoke.

Spoke retainer slot fasteners 170 prevent the spokes 300 from sliding out the lateral end of the spoke slots. In the embodiment shown here, the spoke retainer slot fasteners 170 are shown as threaded fasteners which engage corresponding threads in the lateral end of the slots.

Figure 4:
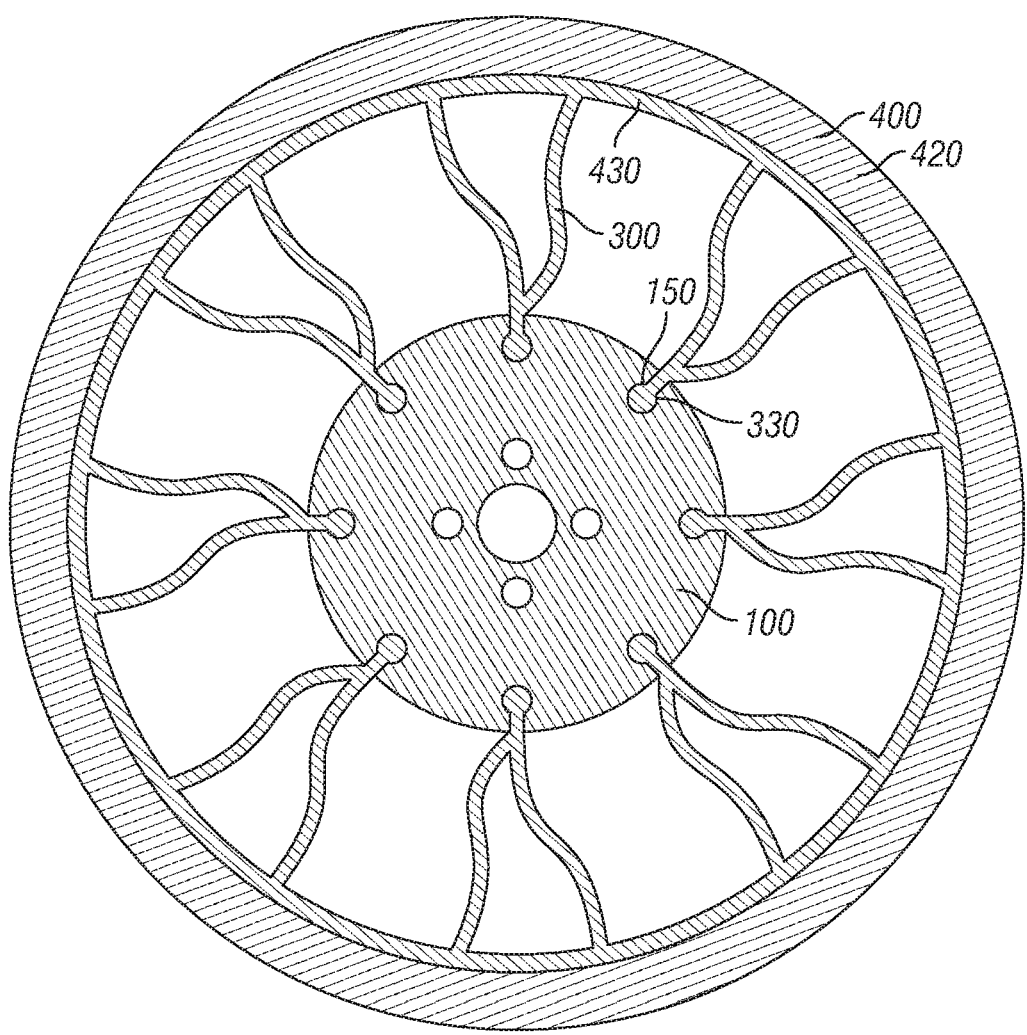
FIG. 4 provides a section view of the non-pneumatic tire taken along line 4-4 in FIG. 3.

FIG. 4 provides a section view of the non-pneumatic tire taken along line 4-4 in FIG. 3. Here the thickened radially inner end 330 of the spoke 300 can be observed secured by the spoke retaining slot 150. The thickened radially inner end 330 is shown to have a generally circular profile. Alternatively, other profile geometries are within the scope of the invention, including quadrilateral, rectangular, square, triangular or kidney shaped profiles.

Figure 5:
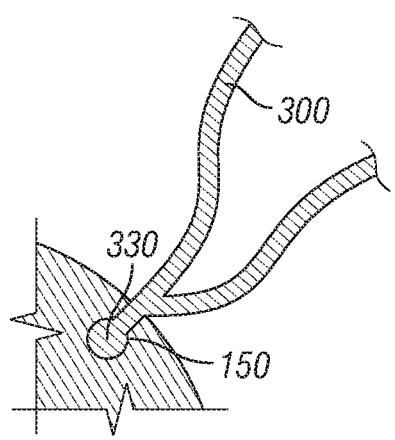
FIG. 5 provides an enlarged partial section view of one of the spokes taken along line 4-4 in FIG. 3.

FIG. 5 provides an enlarged partial section view of one of the spokes taken along line 4-4 in FIG. 3. The spoke retainer slot 150 impinges upon the thickened portion of the radially inner end 330 of the spoke 300, securing the spoke to the hub.

Figure 6:
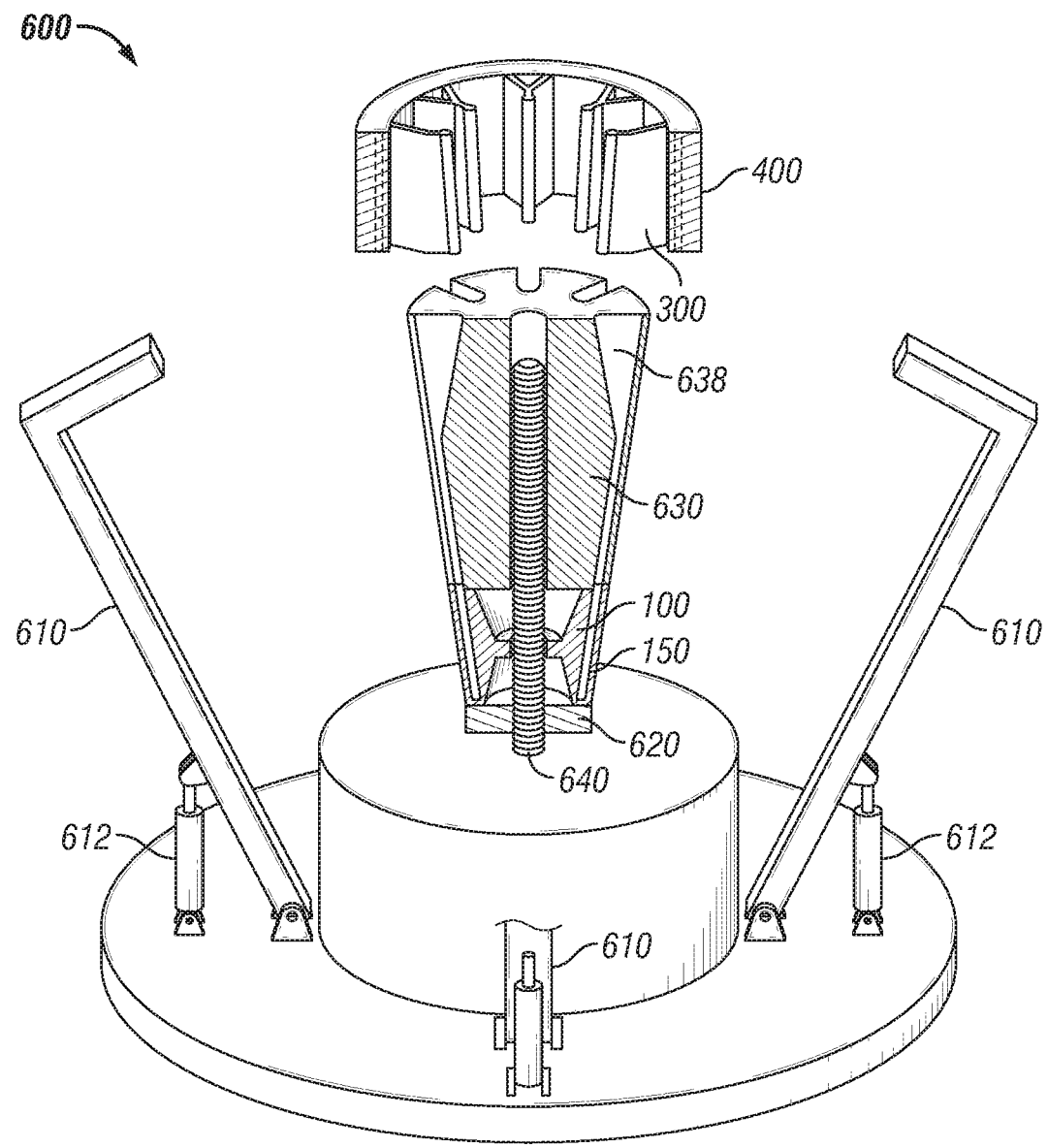
FIG. 6 provides a partial section perspective view of an apparatus for inserting a the outer portion of the wheel into the hub, the section taken along a radial plane bisecting the wheel components, pusher plate and guide.

FIG. 6 provides a partial section perspective view of an assembly apparatus 600 for inserting the outer portion of the wheel into the hub, the section taken along a radial plane bisecting the wheel components 100, 300, 400, pusher plate 620 and guide 630. The assembly apparatus 600 possesses a conically shaped spoke alignment guide 630 which has a plurality of grooves that engage and pull the spokes 300 as the radially outer wheel assembly, 300, 400 is slid down and into the spoke hub 100 to engage the hub's spoke retainer slots 150. The guide 600 possesses a larger diameter first end 632 and a smaller diameter second end 634 and a plurality of guide slots 636. In the embodiment shown, the guide slots 636 have a widened opening 638 at the guide's first end 632 to allow for easier alignment of the spoke ends 330 with the guide slots 636.

The guide 630 provides a mechanism for simultaneous insertion and assembly of the spokes 300 and radially outer band 400 into the hub 100 spoke retainer slots 150. The guide slots 636 are arranged to extend from the first end to the second end whereby the distance between the slots at the first end 632 is larger than the distance between the slots at the second end 634 of the guide 630. In the embodiment shown here, the guide slots 636 are arranged in a frustoconical orientation.

The guide allows the application of spoke pretension during assembly to provide a desired spoke pretension. By allowing the spokes to slide along the guide slots 636, the spoke pretension is applied uniformly and by providing a widened first end 638 to the slot, the spoke alignment and ingress into the slots is facilitated and simplified.

The frustoconical orientation of the spoke retaining slots 150 of the hub 100 reduces binding during the spoke's transition from the guide 600 to the hub 100, but alternative embodiments may include hubs having retaining slots oriented in a cylindrical orientation instead of the frustoconical orientation shown.

Figure 7:
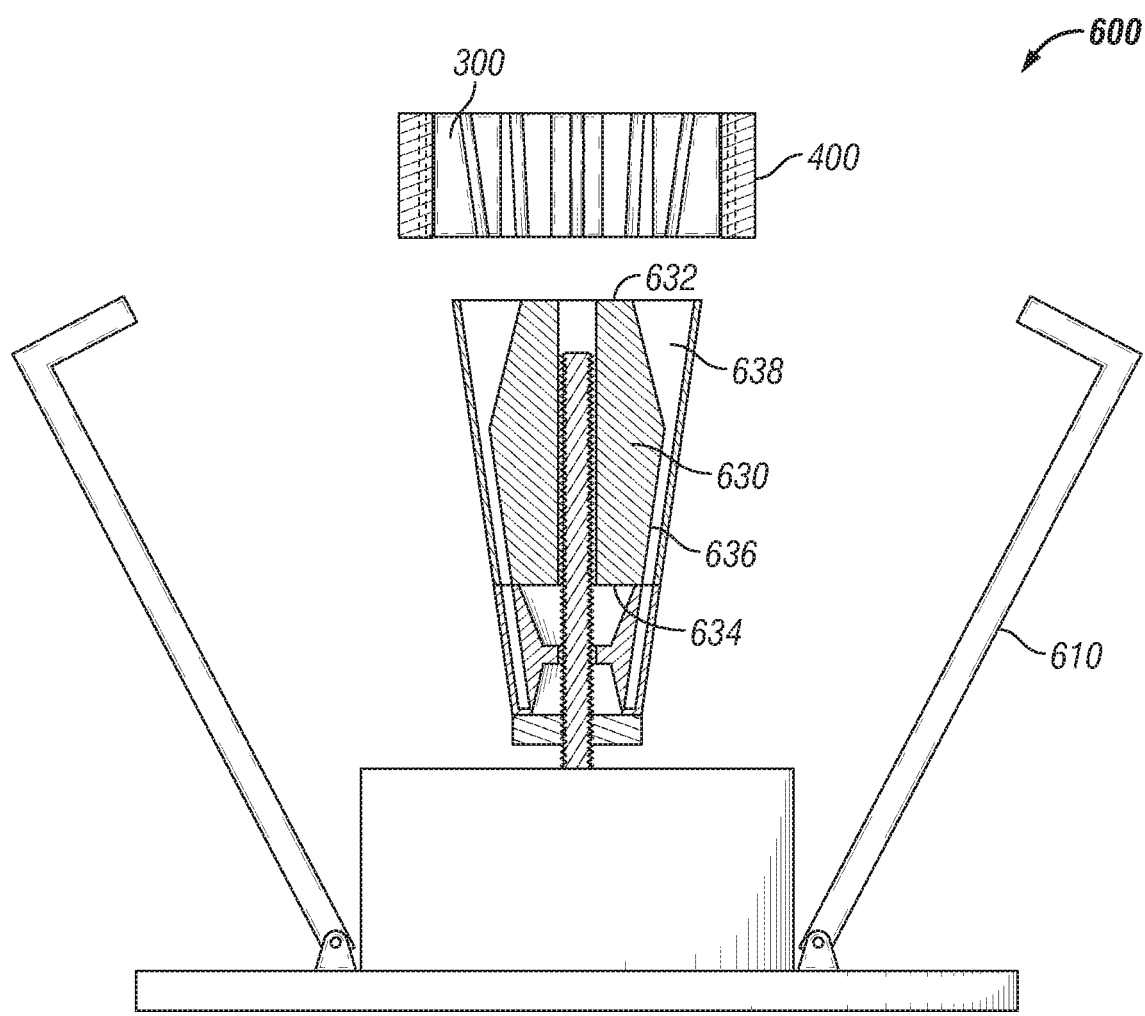
FIG. 7 provides a partial section side view showing the outer wheel portion just prior to insertion into the guide.

FIG. 7 provides a partial section side view showing the guide just prior to the insertion of outer wheel portion into the guide. Just prior to insertion of the spokes into the guide slots, the spokes 300 are aligned with the guide slot openings 638 (facilitated by the relatively enlarged opening compared to the slot geometry toward the guide's second end). The wheel assembly retainers 610 are in an open position as the radially outer wheel assembly is inserted into the guide 630.

Figure 8:
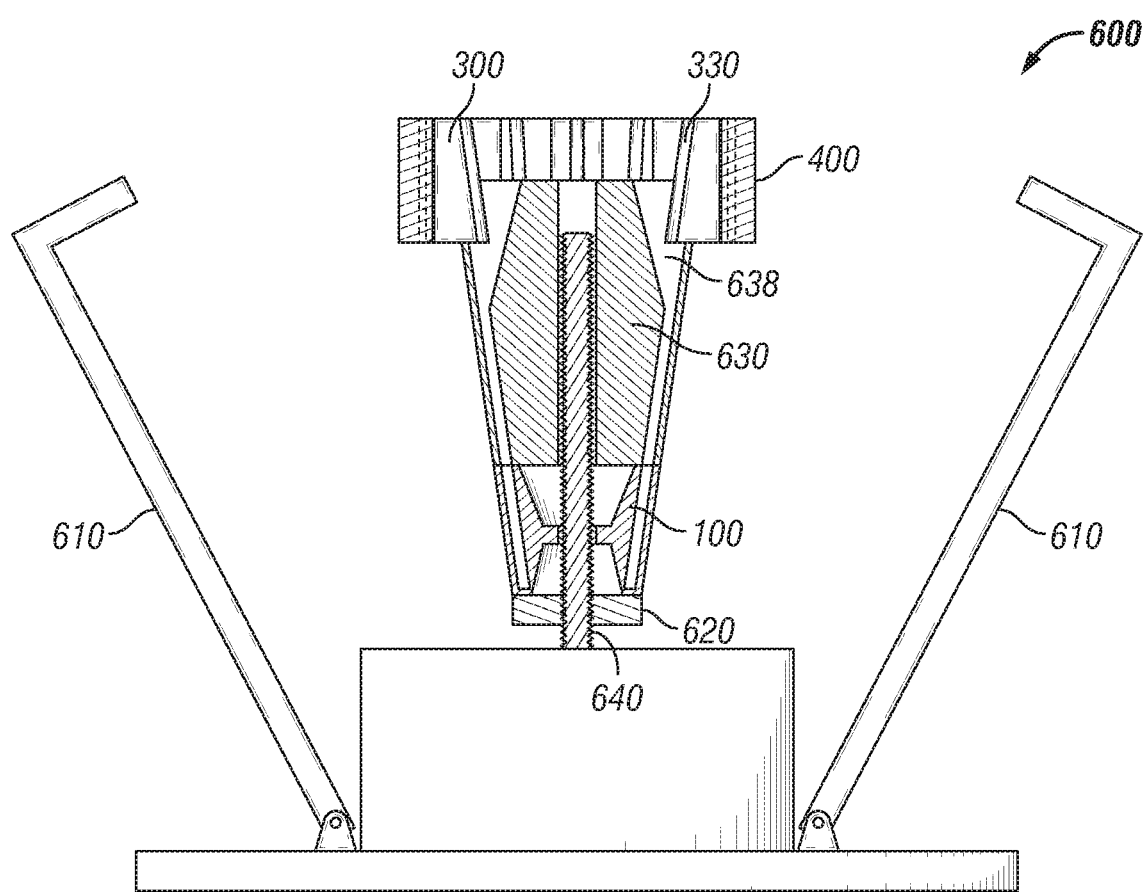
FIG. 8 provides a partial section side view showing the outer wheel portion during insertion into the guide.

FIG. 8 provides a partial section side view showing the outer wheel portion during insertion into the guide. The enlarged openings 638 on the guide 630 narrow as they extend toward the hub 100 so that they engage the radially inner end 330 of the spokes 300 preventing the spokes from being pulled out radially.

Figure 9:
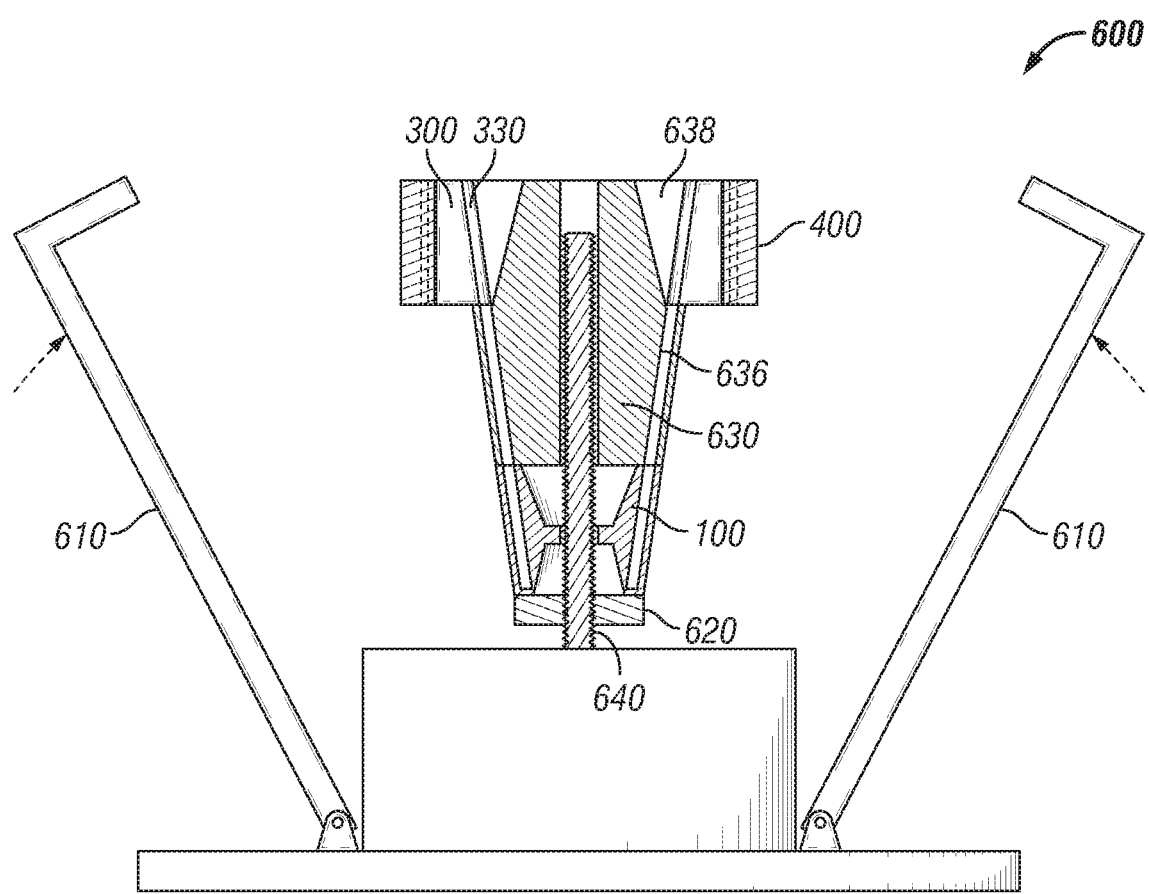
FIG. 9 provides a partial section side view showing the outer wheel portion positioned on the guide.

FIG. 9 provides a partial section side view showing the outer wheel portion positioned on the guide. The guide 630 and guide slots 636 are dimensioned to allow the spokes to slide far enough down the guide 630 to allow closure of the retainers 610 manually or by actuators 612.

Figure 10:
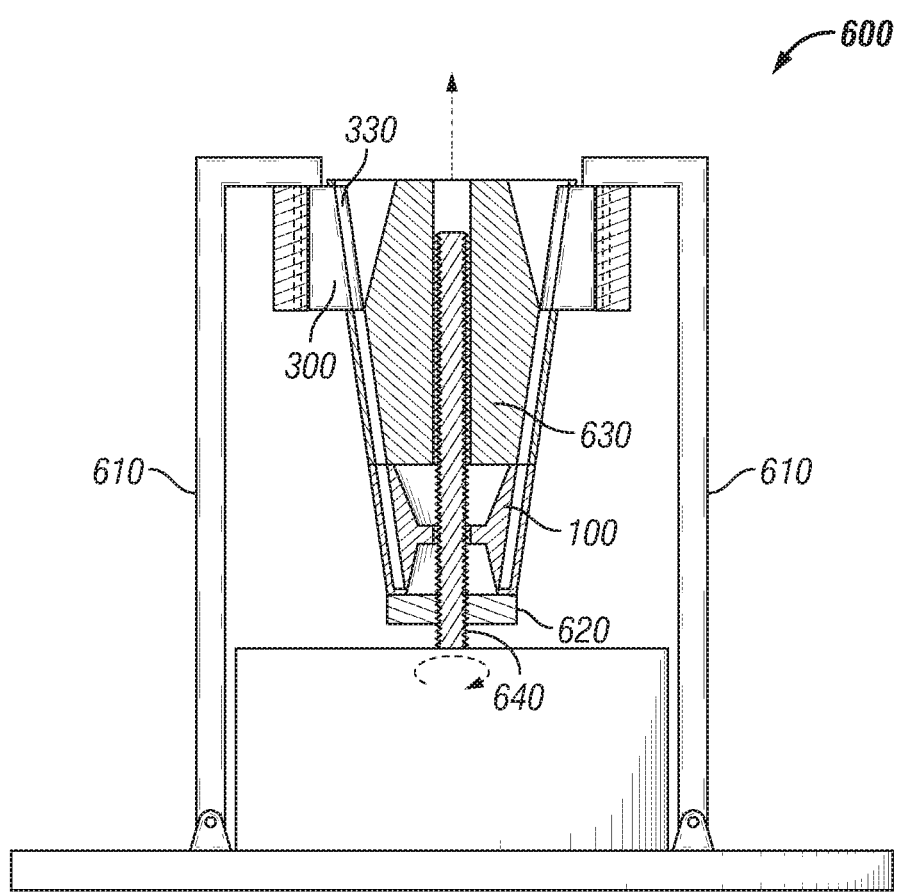
FIG. 10 provides a partial section side view showing the outer wheel portion positioned on the guide with the retainers secured over the wheel.

FIG. 10 provides a partial section side view showing the outer wheel portion positioned on the guide with the retainers secured over the wheel. The guide and hub are moved toward the outer wheel assembly 300, 400 as indicated by the arrows. In the embodiment shown, a helical threaded rod 640 engages corresponding thread on a push plate 620. The turning of the helical threaded rod 640 relative to the push plate 620 forces the hub and guide slot toward the outer wheel assembly and pull the spokes 300 radially inward toward the center axis of the hub. While in this embodiment a helical threaded rod 640 is used to move the push plate 620, alternatively a different type of linear actuator, such as a hydraulic piston or a linear stepper motor may be used to exert a force to move the spokes 300 along the guide slots 636. Alternatively a the retainers could be retracted, forcing the radially outer wheel assembly, 300, 400 down the guide 630 and onto the hub 100.

Figure 11:
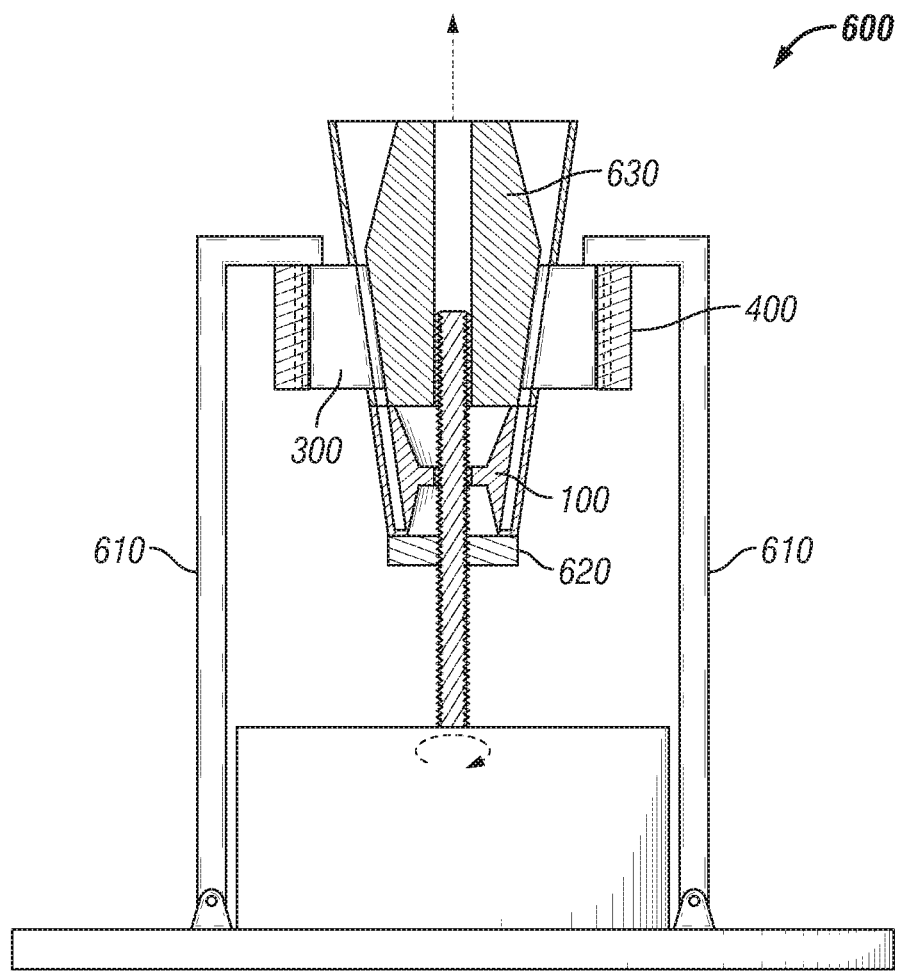
FIG. 11 provides a partial section side view showing the outer wheel portion positioned on the guide with the retainers secured over the wheel and the pusher plate forcing the outer portion of the wheel down the guide toward the hub.

FIG. 11 provides a partial section side view showing the outer wheel portion positioned on the guide 630 with the retainers 610 secured over the wheel and the pusher plate 620 forcing the outer portion 300, 400 of the wheel down the guide 630 toward the hub 100. The guide 630 may be constructed with a material of low coefficient of friction, such as Teflon, and/or may be coated with a substance to provide lubrication to facilitate the sliding of the spokes 300 and the radially inner ends 330 of the spokes within the guide slots 636.

Figure 12:
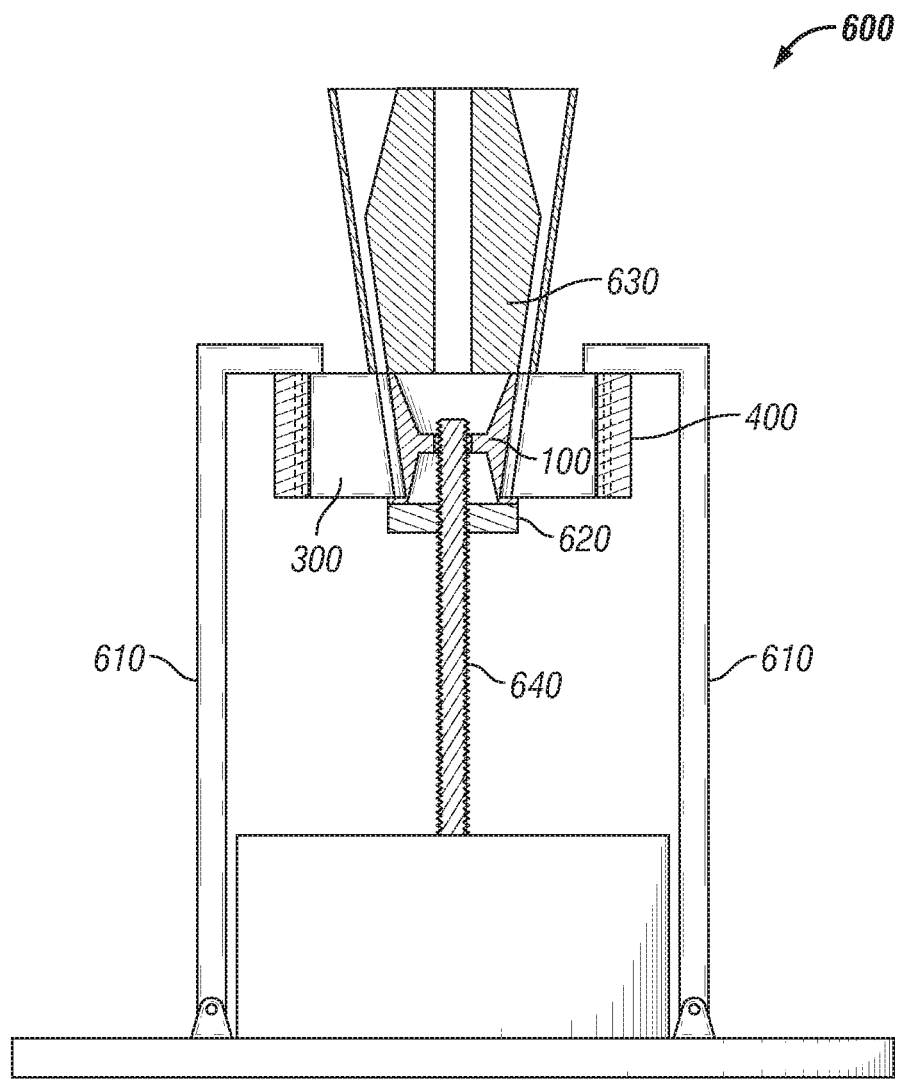
FIG. 12 provides a partial section side view showing the outer wheel portion positioned on the hub.

FIG. 12 provides a partial section side view showing the outer wheel portion 400, 300 positioned on the hub 100. Once the spokes 300 are positioned on the hub 100, the guide 630 may be removed.

Figure 13:
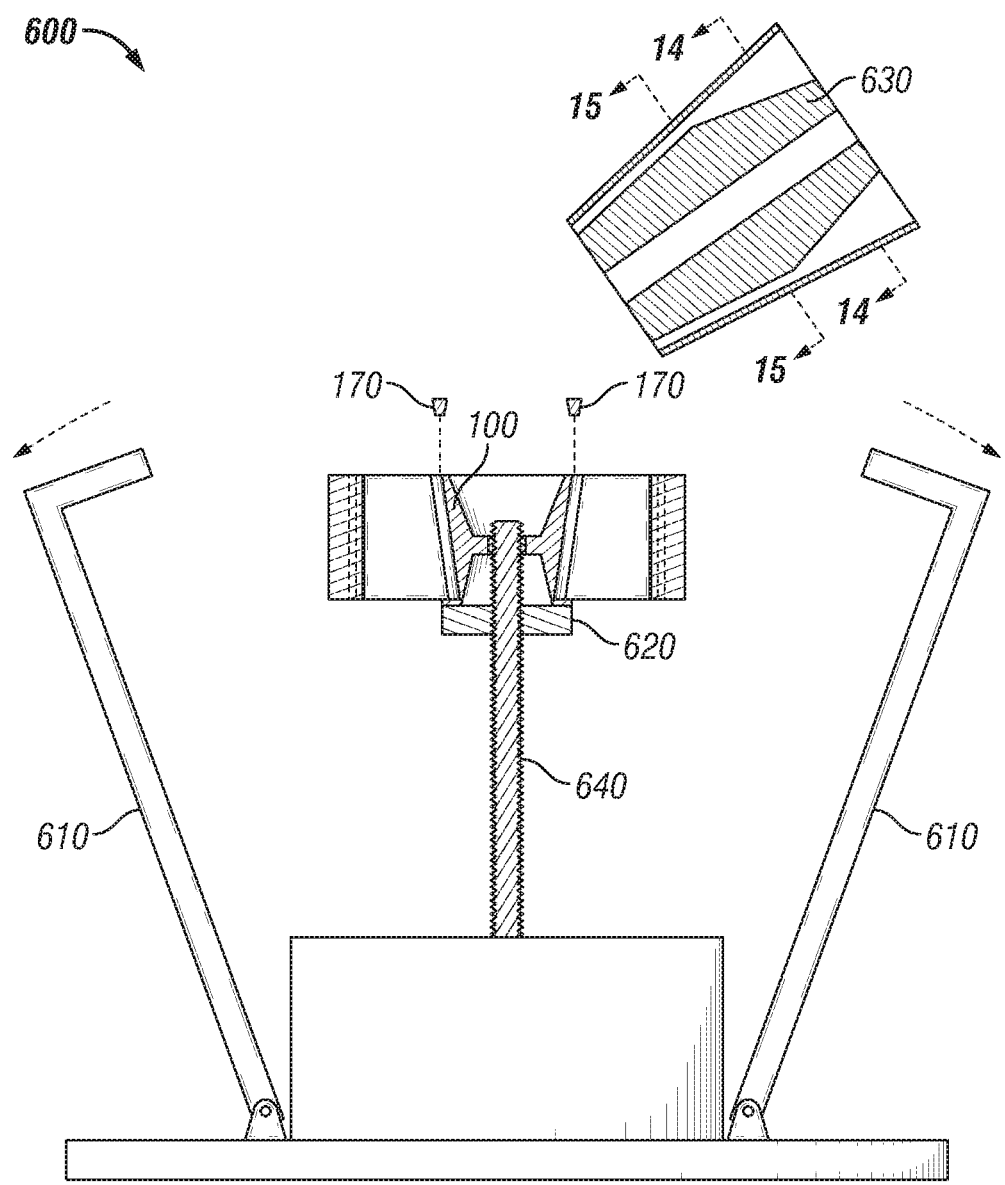
FIG. 13 provides a partial section side view showing removal of the guide and insertion of spoke end retainers onto the hub.

FIG. 13 provides a partial section side view showing removal of the guide 630 and insertion of spoke end retainers 170 onto the hub. In present embodiment, a plurality of threaded spoke end retainers 170 engage corresponding threads in the lateral end of the spoke slots 150 in the hub 100. Once the spokes 300 are secured on the hub 100, the pusher plate 620 retracts downward and the retainers 610 may be released radially outward. The wheel then may be removed from the assembly apparatus 600.

Use of the guide 630 allows for assembly of the outer portion of the wheel to the hub removes the need to manually and individually pull each spoke radially inward and align each spoke with each corresponding slot.

Figure 14:
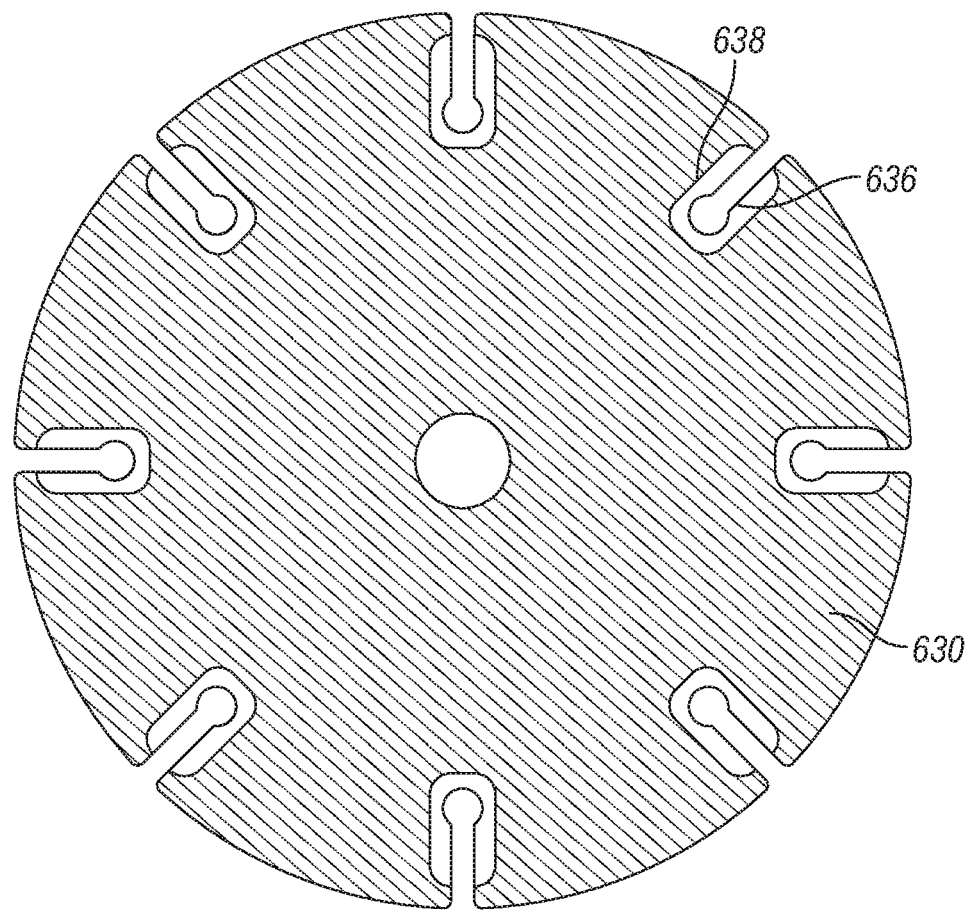
FIG. 14 provides a section view of the guide 630 taken along line 14-14 in FIG. 13.

FIG. 14 provides a section view of the guide 630 taken along line 14-14 in FIG. 13. Here the interior surface of the widened upper portion 638 of the slots 636 of the guide can be seen as the slots narrow. The walls of the guide slots 636 narrow toward the outer surface of the guide preventing the radially inner ends 330 of the spokes 300 from being pulled out of the guide slots 636 as the outer wheel assembly is slid down the guide.

Figure 15:
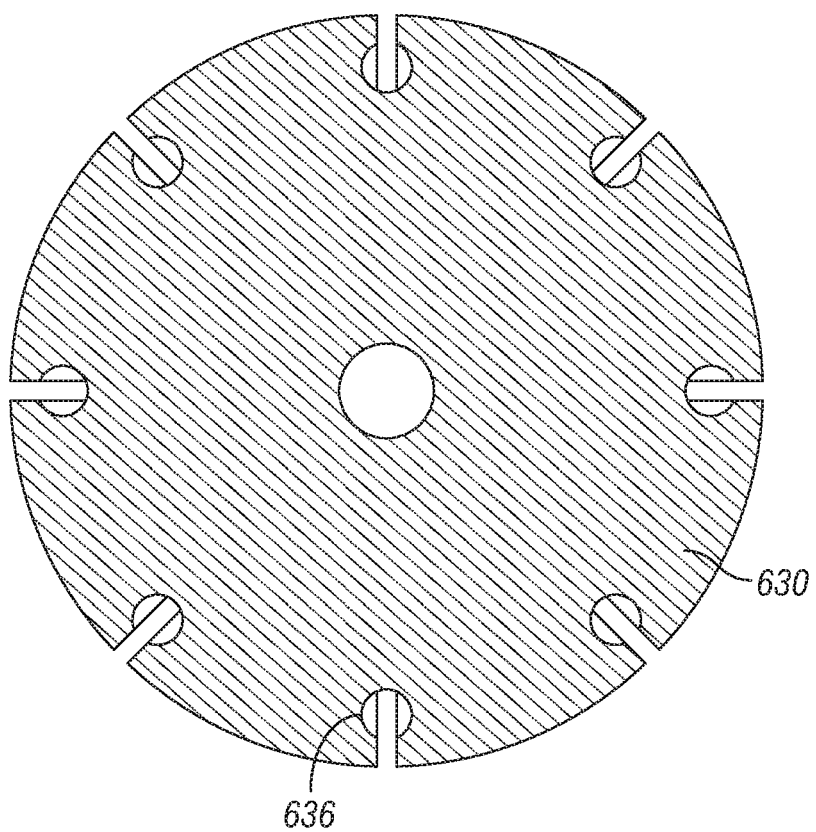
FIG. 15 provides a section view of the guide 630 taken along line 15-15 in FIG. 13.

FIG. 15 provides a section view of the guide 630 taken along line 15-15 in FIG. 13. It can be observed here that the slots are narrower at this lower sectional view than they are in the section in FIG. 14, but continue to be angled radially inward as they extend toward the second guide axial end 634. The inner surface of the slots can be seen on the radially outer portion of the slots as the slots become narrower toward the outer surface of the guide.

It should be understood that other web element configurations and geometries may be used within the scope of the invention, including web elements which are interconnected such as where they may form a honeycomb or other pattern.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for assembling a non-pneumatic wheel's radially outer portion into a hub of the non-pneumatic wheel using an apparatus, the radially outer portion having a plurality of spokes attached at their radially outer end to a compliant outer band, each spoke having a thickened radially inner end, and the hub having a plurality of slots, the method comprising: inserting each radially inner end of each spoke into slots of a guide, said guide comprising: a first end; a second end; a length extending from the first end to the second end; an outer circumferential surface; a plurality of guide slots formed in the outer circumferential surface, the guide slots extending the length of the guide arranged to extend from the first end to the second end whereby a distance between the guide slots at the first end is larger than a distance between the guide slots at the second end; sliding the wheel's outer portion down the length of the guide; aligning the guide slots with the hub slots; and sliding the wheel's outer portion onto the hub.

2. The method of claim 1 wherein the guide slots are arranged in a frustoconical orientation.

3. The method claim 2 wherein each guide slot is narrower at the outer circumferential surface.

4. The method claim 3 wherein said outer circumferential surface is frustoconically shaped.

5. The method claim 4 wherein the slots widen at said first end.

6. The method claim 5 wherein the apparatus further comprises:
a wheel assembly retainer; and
a linear actuator.

7. The method of claim 6 wherein the apparatus further comprises a pusher plate.

8. The method of claim 7 wherein the linear actuator is a rod with helical threads, the helical threads engaging corresponding threads in the pusher plate.

9. The method of claim 6 wherein the apparatus further comprising a plurality of retainers, and an actuator for each of the retainers.

10. The method of claim 6 wherein the linear actuator is a hydraulic piston.

11. The method of claim 6 wherein the wheel assembly retainer pivots from a first position to a second position that forces the outer wheel portion down the guide.

12. The method of claim 8 wherein said helically threaded rod turns, moving the pusher plate along the length of the helically threaded rod.

13. The method of claim 1 wherein said guide is constructed of a material having a coefficient of friction of 0.1 or less.

14. The method of claim 1 wherein said guide slots are lubricated.

15. The method of claim 1 wherein said guide slots are aligned with the slot in the wheel's hub.

16. The method claim 1 wherein the apparatus further comprises:
a wheel assembly retainer; and
a linear actuator.

17. The method of claim 16 wherein the apparatus further comprises a pusher plate.

18. The method of claim 17 wherein the linear actuator is a helically threaded rod, the threads engaging corresponding threads in the pusher plate.

19. The method of claim 16 wherein the apparatus further comprising a plurality of retainers, and an actuator for each of the retainers.

20. The method of claim 16 wherein the linear actuator is a hydraulic piston.

* * * * *